US007948751B2

(12) United States Patent
Escamilla et al.

(10) Patent No.: US 7,948,751 B2
(45) Date of Patent: May 24, 2011

(54) INFORMATION HANDLING SYSTEM FLEXIBLE SECURITY LOCK

(75) Inventors: Eduardo Escamilla, Round Rock, TX (US); Eric Bogner, Austin, TX (US); Paul Bosveld, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 12/500,825

(22) Filed: Jul. 10, 2009

(65) Prior Publication Data

US 2011/0007475 A1 Jan. 13, 2011

(51) Int. Cl.
*G06F 1/16* (2006.01)

(52) U.S. Cl. ....................................... 361/679.57; 70/58

(58) Field of Classification Search .............. 361/679.57
See application file for complete search history.

(56) References Cited

U.S. PATENT DOCUMENTS 5,327,752 A * 7/1994 Myers et al. ...................... 70/58
5,361,610 A * 11/1994 Sanders ............................ 70/14
5,381,685 A * 1/1995 Carl et al. ......................... 70/58
5,687,592 A * 11/1997 Penniman et al. ................ 70/14
5,870,281 A * 2/1999 Kim ......................... 361/679.57
5,960,651 A * 10/1999 Tanisawa .......................... 70/14
5,995,366 A * 11/1999 Howell et al. ............ 361/679.43
6,088,229 A * 7/2000 Seto et al. ..................... 361/726
6,297,963 B1 * 10/2001 Fogle ............................ 361/747
6,305,197 B1 * 10/2001 Ling ................................. 70/30
6,389,853 B1 * 5/2002 Pate et al. ......................... 70/18
6,726,071 B2 * 4/2004 Baseflug et al. .............. 224/258
6,755,056 B2 * 6/2004 Igelmund .......................... 70/58
6,883,694 B2 * 4/2005 Abelow ........................ 224/666
7,299,668 B1 * 11/2007 Lu ..................................... 70/58
7,302,816 B1 * 12/2007 Lu ..................................... 70/58
7,576,981 B2 * 8/2009 Kuo ......................... 361/679.59
7,606,024 B2 * 10/2009 Boss et al. ............... 361/679.57
2005/0262904 A1 * 12/2005 Ling et al. ......................... 70/49
2007/0144225 A1 * 6/2007 Tamura ............................. 70/58
2008/0072633 A1 * 3/2008 Samuel ............................. 70/58
2008/0105007 A1 * 5/2008 Tracy et al. ....................... 70/58
2008/0223090 A1 * 9/2008 Liao .................................. 70/58
2009/0189765 A1 * 7/2009 Lev et al. ................... 340/568.2
2010/0071423 A1 * 3/2010 Dehaan et al. .................... 70/58

* cited by examiner

*Primary Examiner* — Lisa Lea-Edmonds
(74) *Attorney, Agent, or Firm* — Hamilton & Terrile, LLP; Robert W. Holland

(57) ABSTRACT

A security device protects information handling systems from theft with a reduced footprint at the information handling system by interfacing a key receptacle with a lock hook through a flexible member, such as a coaxial cable. Rotation at the key receptacle by a key translates through the flexible member to the lock hook so that the lock hook rotates to a locked position in a lock body integrated with the information handling system chassis. The flexible member avoids or reduces leverage placed on the lock body through the security device.

15 Claims, 2 Drawing Sheets

INFORMATION HANDLING SYSTEM FLEXIBLE SECURITY LOCK

BACKGROUND OF THE INVENTION

1. Field of the Invention

The present invention relates in general to the field of information handling system security, and more particularly to a system and method for an information handling system flexible security lock.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems have become a popular option for individuals and enterprises in our mobile society. Portable information handling systems typically have a display, power source and I/O device integrated into a portable housing so that the system can operate free from any fixed assets, such as external power and external peripherals. For example, a typical portable information handling system has a chassis with a rotationally coupled lid in a "clamshell" configuration. An LCD typically integrates in the lid to display system outputs and a keyboard integrates in the chassis to accept user inputs. A battery typically integrates in the chassis to power the system and charges with an external adapter that converts AC power from a wall socket into DC power provided to the system through a power jack. Recently, portable information handling systems have included a touch screen that accepts user inputs, such as with a keyboard presented at the display. Tablet portable information handling systems rotate the lid so that system has a closed configuration with the display exposed for user interaction.

In order to make portable information handling systems convenient for end users, manufacturers try to minimize the size and weight of the housing so that as much computing power as possible is packed into a given sized housing. Although portability makes portable information handling systems convenient and an attractive alternative for mobile users, portable systems have an increased risk of walking off on their own because portable systems are easier to steal. To prevent or at least discourage theft, portable information handling systems often incorporate a security lock in the chassis. One common lock made by Kensington couples to the system and includes a cable that secures the portable information handling system to a fixed location, such as a table or desk. As portable information handling systems have become thinner and lighter in weight, incorporating a lock into a chassis becomes more difficult because the lock has a larger footprint relative to the system as a whole. Further, smaller, lighter and thinner portable information handling systems provide a less robust base to support the lock. The extension of the lock away from the system provides a leverage arm that a thief can use to break the lock away from the information handling system. Attempts to strengthen the anchor point of the lock on the chassis compromise form factor and weight for the system as a whole.

SUMMARY OF THE INVENTION

Therefore a need has arisen for a system and method which secures an information handling system to reduce the information handling system's form factor and weight.

In accordance with the present invention, a system and method are provided which substantially reduce the disadvantages and problems associated with previous methods and systems for securing an information handling system. A flexible member disposed between a key receptacle and a lock hook translates inputs made at the key receptacle to the lock hook while reducing leverage of forces applied at the key receptacle against a lock body integrated in the information handling system.

More specifically, an information handling system built from plural processing components to process information includes a lock body coupled to or integrated with the housing or chassis that holds the processing components. For example, the information handling system is a portable system having a chassis with a rotationally coupled lid that rotates between open and closed positions. A security device couples to the lock body with a lock hook that inserts in the lock body and rotates between locked and unlocked positions. A key receptacle accepts a key that inputs a rotational force to lock or unlock the lock hook. The key receptacle interacts with the lock hook through a flexible member so that rotational force input at the key receptacle translates to the lock hook. For example, the flexible member is a co-axial cable having an outer surface and an inner cable. The inner cable translates the rotational force and the outer surface protects the inner cable from manipulation. The flexible member flexes in response to lateral forces input at the key receptacle, such as forces off of the axis along which the lock hook inserts into the lock body. For example, the flexible member has a length sufficient to bend from the insertion axis to an axis perpendicular to the insertion axis without placing excessive force on the lock body.

The present invention provides a number of important technical advantages. One example of an important technical advantage is that a flexible security device reduces the risk of damage occurring at a portable information handling system by reducing the leverage available to work against the security device compared with a non-flexible security device. By making the information handling system less vulnerable to damage from leverage applied through the security device, the flexible security device allows a relatively less robust security device attachment point at the information handling chassis so that the information handling system can have a reduced form factor and weight. Thus, thinner and smaller portable systems have improved security without sacrificing form factor or weight. In alternative embodiments, other types of devices may be secured with the security device, such as portable optical devices or any other type of device where footprint of a security device within a housing is limited.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Introducing a flexible member between a key receptacle and a lock hook of an information handling system security device reduce the leverage of force applied at the security device thus reducing risk of damage to the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
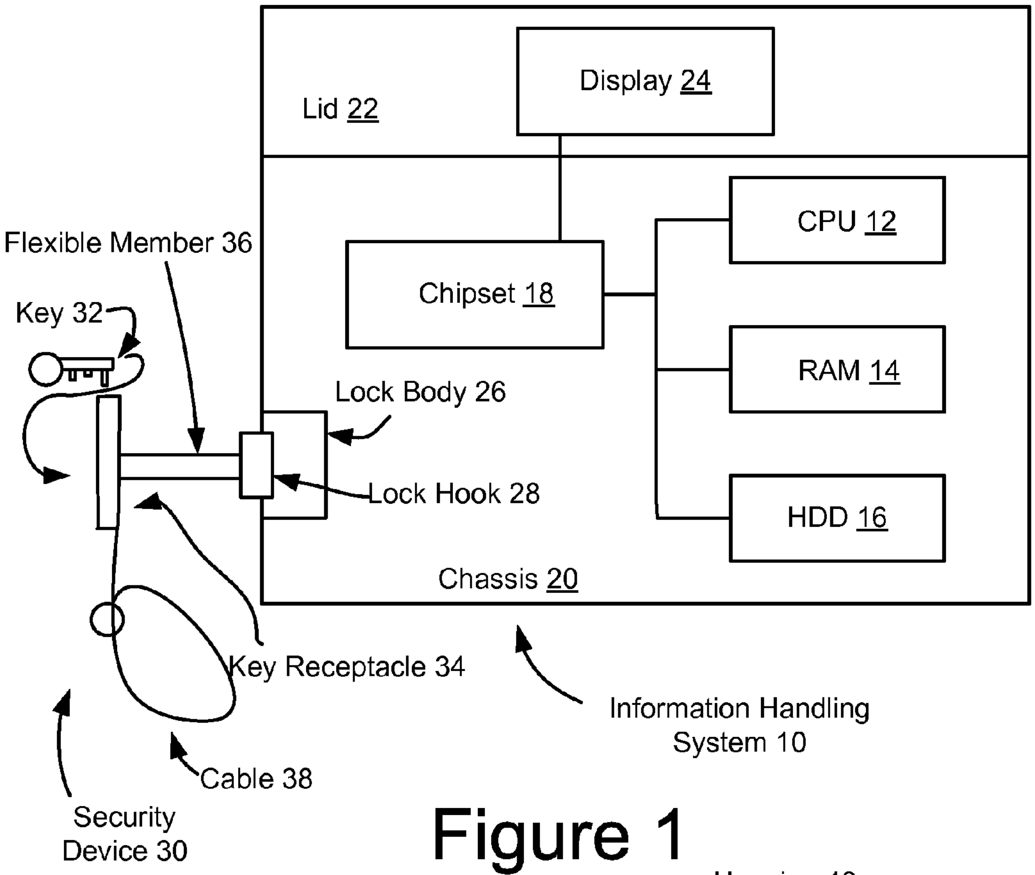
FIG. 1 depicts a block diagram of an information handling system having a security device with a flexible member.

Referring now to FIG. 1, a block diagram depicts an information handling system 10 having a security device with a flexible member. Information handling system 10 is built from a plurality of processing components that cooperate to process information, such as a CPU 12, RAM 14, a hard disk drive 16 and a chipset 18 disposed in a chassis 20. A lid 22 rotationally couples to chassis 20 to rotate between open and closed positions so that a display 24 integrated in lid 22 is exposed in the open position to present information generated by the processing components. Chassis 20 has a lock body 26 integrated so that lock body 26 will not separate from chassis 20 unless excessive force is applied. Lock body 26 accepts a lock hook 28 of a security device 30 so that security device 30 securely couples to lock body 26. A key 32 fits into a key receptacle 34 to allow rotation of the key receptacle with a rotational input by key 32. Rotational movement at key receptacle 34 translates through a flexible member 36 to lock hook 28 so that lock hook 28 rotates between a locked position with lock hook 28 engaged in lock body 26 and an unlocked position with lock hook 28 free to disengage from lock body 26. Flexible member translates rotational movement from key receptacle 34 to lock hook 28 through a non-rigid material that allows flexing of flexible member 36 off of the axis at which lock hook 28 inserts into lock body 26. By flexing, flexible member 36 reduces leverage applied at lock body 26 from lateral forces applied at key receptacle 34 to reduce the risk that lock body 26 will break. A cable 38 couples to key receptacle 34 at one end and a fixture at another end, such as a table or chair, to secure information handling system 10 to the fixture.

Figure 2:
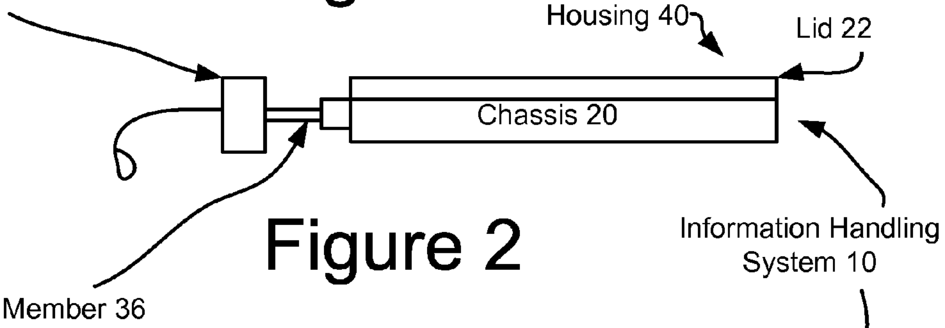
FIG. 2 depicts a side view of an information handling system housing having a security device with the flexible member aligned with an insertion axis for insertion of the security device into a lock body of the information handling system.
Figure 3:
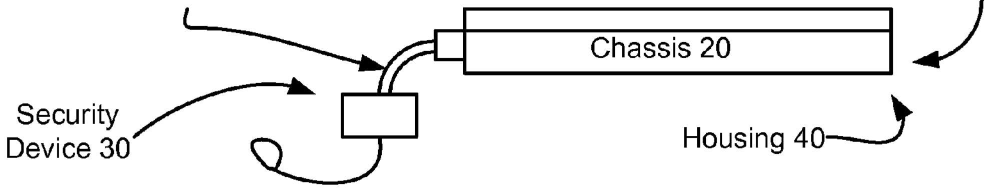
FIG. 3 depicts a side view of an information handling system having a security device with the flexible member bent to an axis perpendicular to the insertion axis.

Referring now to FIG. 2, a side view depicts an information handling system housing 40 having a security device 30 with flexible member 36 aligned with an insertion axis for insertion of the security device into a lock body 26 of information handling system 10. Housing 40 encloses chassis 20 and lid 22 and is depicted with chassis 20 and lid 22 in a closed position. FIG. 3 depicts a side view of information handling system housing 40 having a security device 30 with the flexible member 36 bent to an axis perpendicular to the insertion axis depicted by FIG. 2. Flexible member 36 flexes in response to lateral forces such as a downward force that causes flexing from the position of FIG. 2 to the position of FIG. 3 so that the lateral force is absorbed by flexible member 36 instead working against lock body 26.

Figure 4:
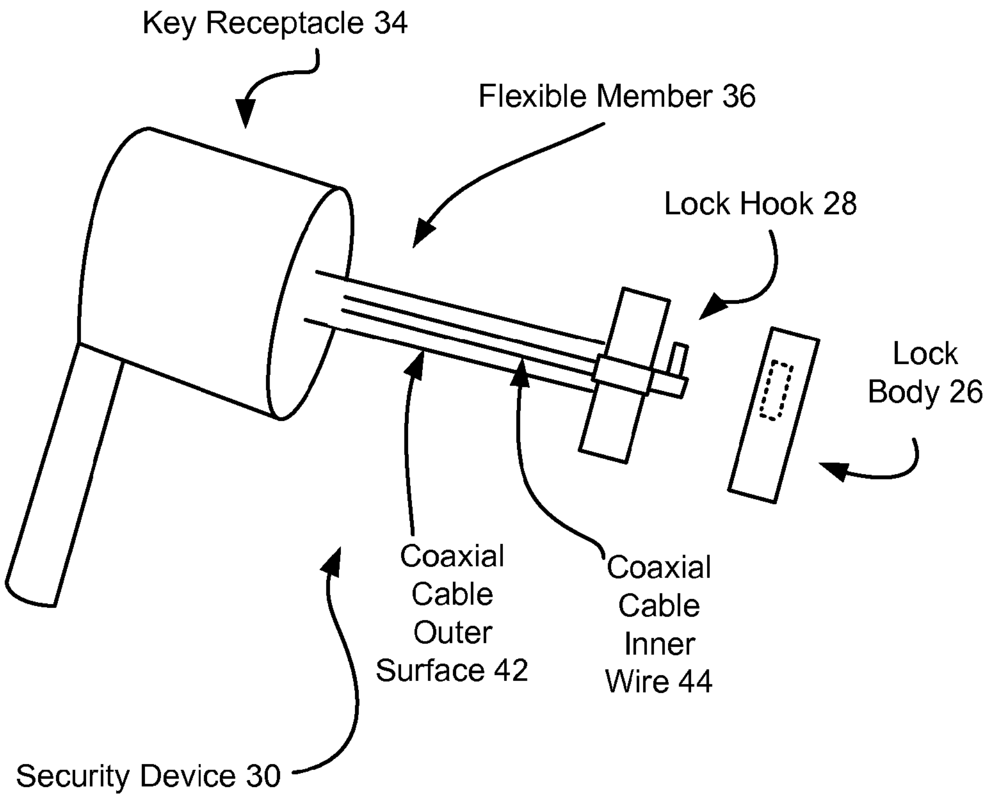
FIG. 4 depicts an example embodiment of a flexible member having a coaxial cable to translation rotation from a key receptacle to a lock hook.

Referring now to FIG. 4, an example embodiment is depicted of a flexible member 36 having a coaxial cable to translate rotation from a key receptacle 34 to a lock hook 28. Flexible member 36 has a coaxial cable outer surface 42 and a coaxial cable inner wire 44. Outer surface 42 is a flexible material, such as a resilient plastic or rubber, that protects inner wire 44 from manipulation. Inner wire 44 is a flexible material having sufficient strength to translate rotational force from key receptacle 36 to lock hook 28, such as a steel or copper wire. In one embodiment, key receptacle 36 and lock hook 28 are components from a conventional KENSINGTON lock that interact through the addition of flexible member 36 between key receptacle 34 and lock hook 28. A coaxial cable flexible member 36 supports translation of rotation by a key of key receptacle 34 to lock hook 28 through inner wire 44 while outer surface 42 prevents manipulation of inner wire 44 except by inputs made through a key at key receptacle 34.

Although the present invention has been described in detail, it should be understood that various changes, substitutions and alterations can be made hereto without departing from the spirit and scope of the invention as defined by the appended claims.

What is claimed is:

1. An information handling system comprising:

a chassis;

a lid rotationally coupled to the chassis and operable to rotate between an open and a closed position;

processing components disposed in the chassis and operable to generate information;

a display integrated in the lid and interfaced with the processing components, the display operable to present the information;

a lock body coupled to the chassis, the lock body operable to accept a locking device; and a locking device having a key receptacle, a lock hook and a flexible member connecting the key receptacle and the lock hook, the key receptacle rotating between a locked and unlocked position in response to movement of a key, the lock hook rotating between a locked position engaged with the lock body and an unlocked position free from the lock body, the flexible member translating movement of the key receptacle to the lock hook so that rotating the key receptacle to a locked position engages the lock hook in the lock body and rotating the key receptacle to the unlocked position frees the lock hook from the lock body.

2. The information handling system of claim 1 wherein the flexible member comprises a cable having a non-rotating outer surface and a rotational inner wire, the rotational inner wire translating movement of the key receptacle to the lock hook.

3. The information handling system of claim 1 further comprising a key that interacts with the key receptacle to allow rotation of the key receptacle.

4. The information handling system of claim 1 wherein the flexible member has a length between the key receptacle and the lock hook, the length having a distance adequate to allow the key receptacle to travel from an axis aligned with the look hook to an axis perpendicular to the lock hook.

5. The information handling system of claim 1 further comprising a cable having a first end coupled to the key receptacle and a second end operable to couple to a fixed object.

6. A method for securing an information handling system, the method comprising:

integrating a lock body with a chassis of the information handling system;

inserting lock hook into the lock body;

applying a rotational force at a key receptacle; and translating the rotational force from the key receptacle to the lock hook through a flexible member disposed between the key receptacle and lock hook.

7. The method of claim 6 wherein translating the rotational force further comprises rotating the lock hook to a locked position within the lock body.

8. The method of claim 6 wherein translating the rotational force further comprises rotating the lock hook to an unlocked position within the lock body.

9. The method of claim 6 further comprising moving the key receptacle from an axis aligned with the lock body to an axis perpendicular to the lock body by bending the flexible member.

10. The method of claim 6 further comprising securing the key receptacle to a fixed object to secure the information handling system to the fixed object.

11. The method of claim 6 wherein the flexible member comprises a coaxial cable having an inner cable that translates the rotational force from the key receptacle to the lock hook and an outer casing that encloses the inner cable.

12. A security device comprising:

a lock body that couples to a valuable;

a lock hook sized to fit into the lock body in an unlocked configuration and to rotate in the lock body between the unlocked configuration and a locked configuration;

a key receptacle operable to accept a key and to rotate between locked and unlocked positions in response to a rotational input by the key; and a flexible member disposed between the lock hook and the key receptacle, the flexible member operable to translate rotational inputs by a key at the key receptacle to rotate the lock body between the locked and unlocked configuration.

13. The security device of claim 12 where in the flexible member comprises a coaxial cable having an outer surface and an inner wire, the inner wire in physical communication between the key receptacle and the lock hook.

14. The security device of claim 13 further comprising a security cable coupled to the key receptacle and operable to secure to a fixture.

15. The security device of claim 14 further comprising a key operable to fit in the key receptacle and to rotate the key receptacle.

* * * * *